United States Patent [19]
Mattsson

[11] Patent Number: 5,830,314
[45] Date of Patent: Nov. 3, 1998

[54] CLEANING CONDENSATES FROM MULTI-EFFECT EVAPORATOR OF CELLULOSE PULP WASTE LIQUORS

[75] Inventor: Hakan Mattsson, Stockholm, Sweden

[73] Assignee: Ahlstrom Machinery Corporation, Helsinki, Finland

[21] Appl. No.: 523,605

[22] Filed: Sep. 5, 1995

[30] Foreign Application Priority Data

Sep. 6, 1994 [SE] Sweden .................................. 9402971

[51] Int. Cl.$^6$ .............................. B01D 1/26; B01D 3/02; D21C 11/06

[52] U.S. Cl. ........................ 159/17.1; 159/24.2; 159/47.3; 202/174; 203/25; 203/27; 162/46; 162/47; 162/68

[58] Field of Search ..................................... 159/47.3, 2.1, 159/16.3, 17.1, 24.2, 24.1, DIG. 8; 203/49, 25, 27, 88, DIG. 8, DIG. 9; 202/176, 174; 162/47, 29, 46, 68, 63

[56] References Cited

U.S. PATENT DOCUMENTS

| | | | |
|---|---|---|---|
| 3,807,479 | 4/1974 | Brannland et al. ..................... | 159/17.3 |
| 4,002,525 | 1/1977 | Baierl ..................................... | 159/17.3 |
| 4,100,016 | 7/1978 | Diebole et al. ........................... | 162/29 |
| 4,878,535 | 11/1989 | Rosenblad . | |
| 5,382,321 | 1/1995 | Fagerlind et al. . | |

FOREIGN PATENT DOCUMENTS

| | | |
|---|---|---|
| 1087130 | 10/1980 | Canada . |
| 0 188 019 | 7/1986 | European Pat. Off. . |
| WO 89/10172 | 11/1989 | WIPO . |

OTHER PUBLICATIONS

"Chemical Recovery in the Alkaline Pulping Processes", Third Edition, Prepared by the Alkaline Pulping Committee of the Pulp Manufacture Division Committee Assignment No. 6500; Co–edited by Robert P. Green and Gerald Hough; TAPPI Press ©1992.

Design Considerations for Condensate Segregation and Methanol/TRS Stripping, Beckstrom et al, 1992 *Kraft Recovery Operations Short Course,* pp. 141–149.

Primary Examiner—Virginia Manoharan
Attorney, Agent, or Firm—Nixon & Vanderhye P.C.

[57] ABSTRACT

Volatile compounds, such as methanol, are separated from secondary condensates formed in multi-effect evaporation of waste liquor, such as black liquor, from cellulose pulp processes. The condensable secondary vapor is condensed into first and second condensate flows, the first of which, smaller in volume, contains the majority of the volatile compounds condensed in the evaporating effect. The first condensate flows from one or more first evaporation effects, and/or condensers of the evaporation plant, are directed for cleaning into a first steam stripping column. At least some of the second flows are directed to a second steam stripping column to be recovered as very clean condensate, cleaner than the condensate flow from the first stripping column and typically have a methanol concentration of less than 25 ppm, preferably about 10 ppm or less.

19 Claims, 2 Drawing Sheets

5,830,314

CLEANING CONDENSATES FROM MULTI-EFFECT EVAPORATOR OF CELLULOSE PULP WASTE LIQUORS

BACKGROUND AND SUMMARY OF THE INVENTION

The present invention relates to a method of increasing the efficiency of separating volatile compounds, such as methanol, from the secondary condensates formed in the multi-effect evaporation of cellulose pulp process waste liquors, such as black liquor.

Sulphate cooking of cellulose pulp produces malodorous organic sulphur compounds, such as methyl mercaptan, dimethyl sulphide and dimethyl disulphide, as the sulphide and hydrogen sulphide ions react with lignin and the methoxyl groups of lignin fragment. Sulphate cooking also produces a large amount of methanol. Large amounts of vapors containing methanol and sulphur compounds are released, e.g., in the evaporation of black liquor, in which the above-mentioned compounds are distilled and condensed into the condensates of a multi-effect evaporation plant. Methanol has a high COD (Chemical Oxygen Demand), and therefore methanol is removed to lower the COD-level.

According to the invention the condensates described above are treated so as to concentrate the above-mentioned volatile components into a volume of contaminated condensate that is as small as possible, and which is then typically cleaned by steam stripping. The condensates can be split into a relatively clean condensate stream, and a contaminated condensate stream. This selective condensation can be achieved, e.g., by partitioning the heat exchange elements. U.S. Pat. No. 4,878,535 discloses such a construction. The inside of the plate heat exchange element, into which secondary vapor is fed as heating medium, is divided by means of an inclined partition wall into an upper and a lower compartment. Steam is fed into the lower compartment, in which the more easily condensed compounds, such as water vapor, are condensed, and the condensate formed in this compartment is relatively clean water, which nevertheless contains some methanol. This condensate can be used as such, e.g., in washing pulp or in oxygen delignification, in cases where this condensate is considered as having sufficient purity. From the lower compartment, the vapor flows into the upper compartment, thus causing the vapor in the upper compartment to contain a larger percentage of volatile impurities, so that a contaminated condensate requiring cleaning is formed. The volume of the contaminated condensate can, by element design, freely vary within a certain range depending on each user's demand concerning cleanness of the clean condensate. Normal figures are between 10–20% of the total amount of the condensates in the evaporation plant. This condensate is cleaned via steam stripping by most users.

The purpose of the present invention is to provide a method of producing secondary condensate with a COD-level that is much lower than that which is possible to reach with traditional systems. The objective is to reduce the methanol content in the secondary condensate to values less than 25 ppm, preferably about 10 ppm or less; i.e. provide very clean condensate. Another purpose is to produce such condensate while maintaining the steam economy of a conventional multi-effect evaporation plant at its present level, i.e. so that essentially no additional heat is needed to produce cleaner condensate than previously obtained.

According to one aspect of the present invention a method of separating volatile compounds from secondary condensates formed in multi-effect evaporation of waste liquor from cellulose pulp processes is provided, utilizing first and second steam stripping columns. The method comprises the following steps: (a) Evaporating, in a multi-effect evaporator, waste liquor from cellulose pulp processing to produce a secondary vapor. (b) Condensing the secondary vapor from step (a) into a first condensate flow having a low volume but the majority of the volatile compounds condensed, and a separate second condensate flow. (c) Directing the first condensate flow into the first steam stripping column to produce a first cleaned condensate flow. (d) Directing the second condensate flow into the second steam stripping column to produce a second cleaned condensate flow having a lower concentration of volatile compounds than that of the first cleaned condensate flow. And, (e) driving the second steam stripping column utilizing vapor from the evaporation of waste liquor of step (a).

The multi-effect evaporator typically has at least four evaporation stages, and step (a) is practiced by evaporating waste liquor in at least a first stage of the multi-effect evaporator to produce the secondary vapor. The volatile compounds include methanol as a major component thereof, and the evaporation stages include a plurality of final evaporation stages. There are thus typically the further steps of: (f) As part of step (a), evaporating the waste liquor in the final evaporator stages to produce a second secondary vapor. (g) Condensing the second secondary vapor into third and fourth condensate flows. And, (h) treating the third and fourth condensate flows separately from each other so that at least one of the third and fourth condensate flows comprises clean condensate having a methanol concentration of about 25 ppm or less. Step (h) is typically practiced by flash evaporation of the third condensate flow to produce a liquid and then by directing the liquid to the second steam stripping column, to produce a clean condensate having a methanol concentration of about 25 ppm or less, typically about 10 ppm or less.

According to another aspect of the present invention a system for the evaporation of black liquor, or like waste liquors from cellulose pulp processing, is provided. The system comprises the following components: At least four evaporation stages including a first stage and a final stage in the direction of waste liquor movement. Each of the stages having evaporator elements including first and second distinct condensate discharges. A first steam stripping column. A second steam stripping column. The first condensate discharge from at least the first stage connected directly to the first steam stripping column. The second condensate discharge from at least the first stage connected directly to the second steam stripping column. And, the second condensate discharge from at least two of the evaporator stages besides the first stage connected to the second stripping column.

The present invention is especially suitable for use in the evaporation of kraft black liquor to produce a condensate of extremely low COD. It can also be utilized for waste liquors of high COD of other pulp processes, such as the sulphite process.

The present invention may be applied in connection with all types of evaporators, such as lamella evaporators, tube evaporators with external heat exchangers, and other conventional evaporators in which condensate segregation is obtained.

According to the present invention the secondary condensates produced in various stages of a waste liquor evaporation plant are first split in a conventional manner into two streams, into one of which, having a lower volume, the majority of the impurities, such as COD compounds, are concentrated. An absolute majority of these compounds is evaporated in the first evaporation effects (first three effects and flash stages possibly preceding them in case of a seven-effect evaporation plant), which thereby produces the contaminated condensates. Very clean secondary condensate to be used in a pulp mill can be produced by connecting a second steam stripping column into the evaporation in addition to the column system normally used for separating impurities from the condensates. The second stripping column, used for additional stripping, is used for treating at least a portion of the cleaner condensates from the above-mentioned first effects, thereby producing very clean condensate. The amount of condensate to be treated depends, e.g., on the amount of very clean condensate needed.

The clean condensate from the last evaporation effects, in relation to the waste liquor flow and the contaminated condensate containing the main portion of impurities, are treated separately so that, if desired, they can be cleaned into very clean condensates. The amount of impurities contained by the clean condensate can be minimized by flash evaporating these condensates, subsequent to which they can be combined with the flow of very clean condensate from the additional stripping column. The contaminated condensate from the last effects is also flash evaporated, but after that it is additionally treated in the additional stripping column.

The additional stripping column system preferably also comprises a steam reboiler, in which the cleaned condensate from the column is reboiled by vapor from one of the evaporation effects, thus producing cleaning steam for the stripping column. The construction of the reboiler is similar to the evaporators, i.e. the vapor to be condensed is divided into different fractions.

In the evaporation plant, the additional stripping column system is connected between two subsequent evaporation effects at the end of the evaporation plant in relation to the steam flow, or between the last evaporation effect and the condenser. It is preferably connected at a location where the desired product temperature is automatically achieved. This means that heat exchangers for condensate are not necessary, avoids the necessity of increasing the consumption of steam when compared to a system without a second stripping column.

The amount of condensate to be treated in the second stripping column can be readily adjusted. The system can be designed so as to have all condensates treated in it, even the condensates from the actual stripping column. On the other hand, only a small volume can be treated. The choice typically depends on the amount of very clean condensate needed by the mill and the desired degree of cleanness. The smaller the amount of very clean condensate, the cleaner it will be. The volume of available cleaning steam restricts maximum efficiency. Higher cleaning efficiency can be achieved by increasing the area of the heat surfaces, which increases investment cost, or by deleting one evaporation effect, which would increase heat consumption.

It is the primary object of the present invention to provide for the effective production of condensate having a cleanliness greater than can conventionally be obtained during the evaporation of black liquor, or like waste liquors from cellulose pulp processing (even to a cleanliness such that the condensate has a methanol concentration of about 25 ppm or less, preferably about 10 ppm or less), without a significant addition of heat compared to conventional practice. This and other objects of the invention will become clear from an inspection of the detailed description of the invention and from the appended claims.

DETAILED DESCRIPTION OF THE DRAWINGS

Figure 1:
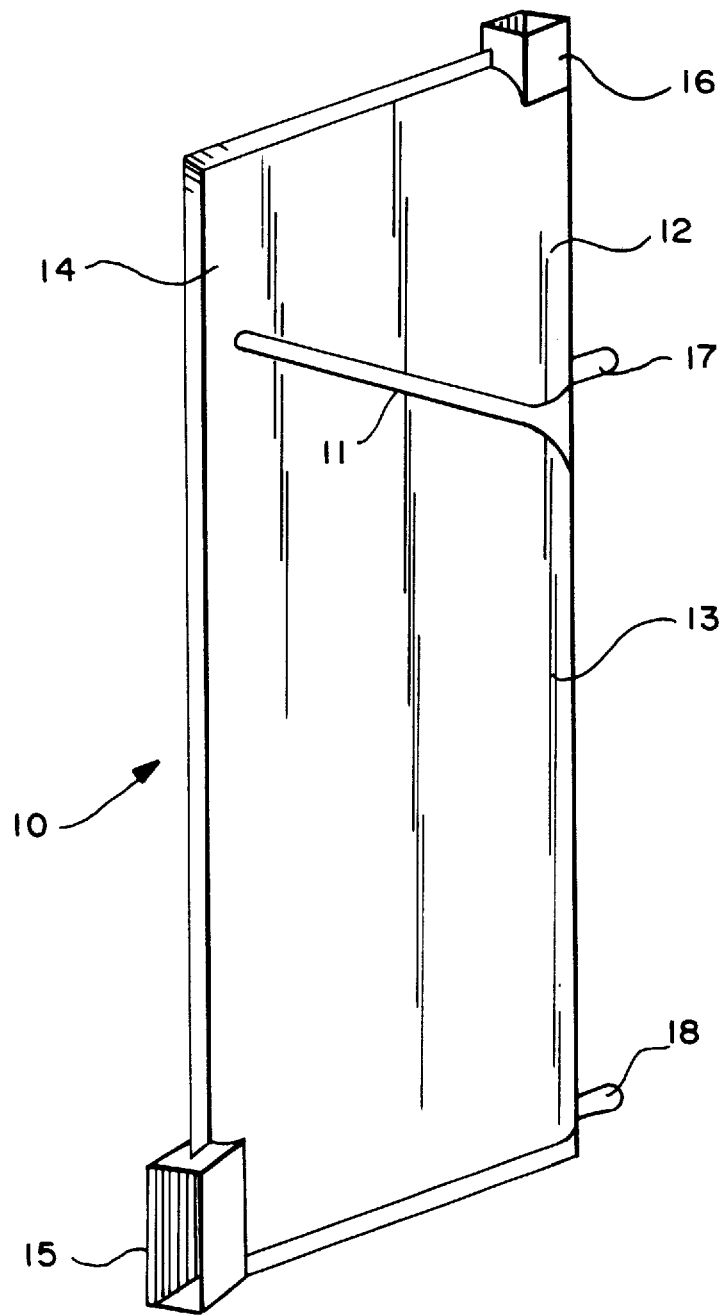
FIG. 1 is a schematic illustration of a heat exchange element construction that can be used in connection with carrying out the method according to the invention for producing different condensates.

As shown in FIG. 1, the inside of an evaporator element 10 formed by two joined plates is divided by an inclined partition wall 11 into two compartments 12 and 13. Heating vapor is fed via conduit 15 to the inside of the lower compartment 13, in which relatively clean condensate is formed to be discharged via conduit 18. Uncondensed vapor flows via opening 14 to the upper compartment 12, in which contaminated condensate forms and is discharged via conduit 17. Uncondensed vapor is discharged from the evaporator element 10 via a conduit 16.

Figure 2:
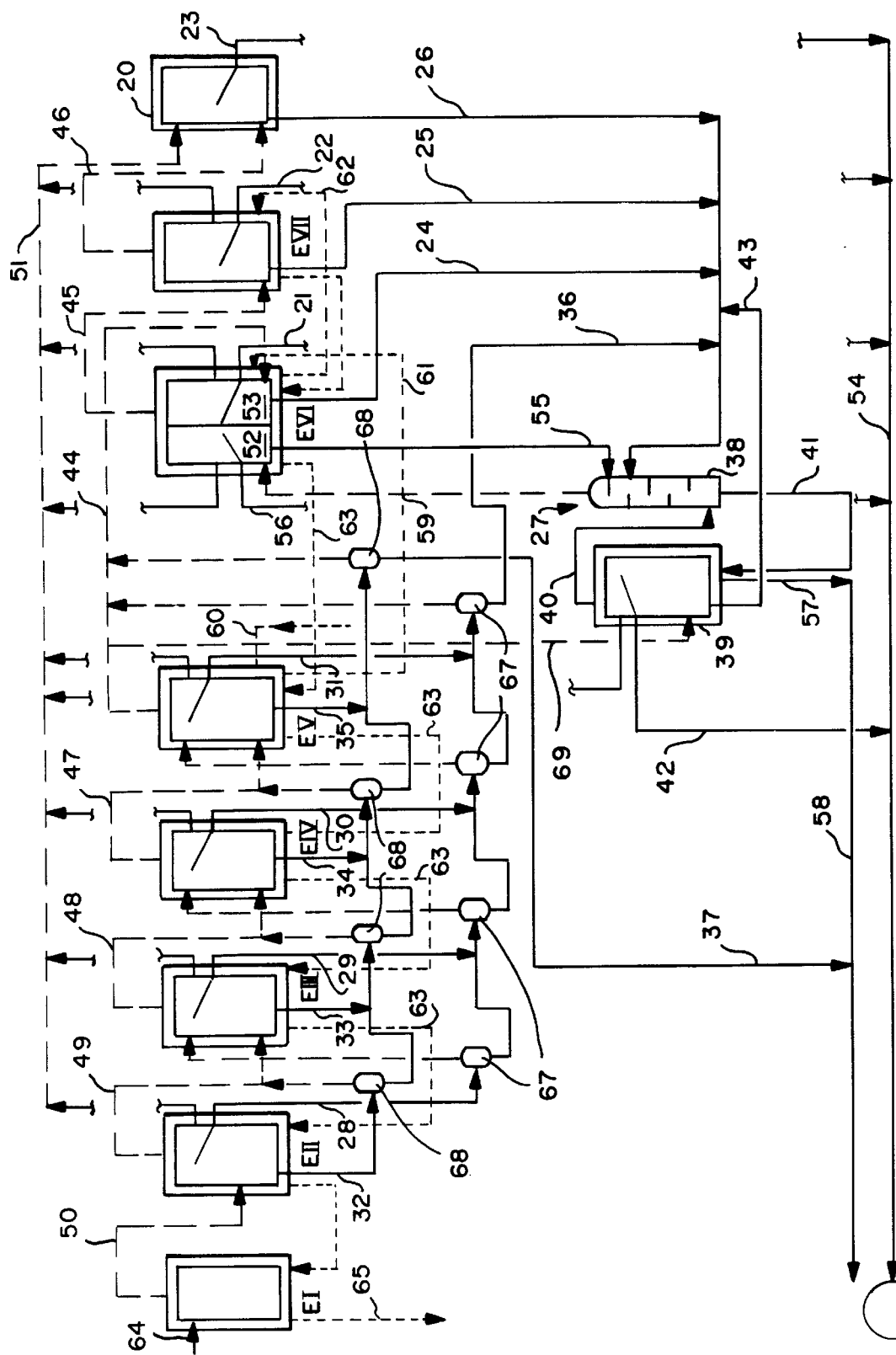
FIG. 2 is a schematic flow diagram of an advantageous embodiment of an exemplary system according to the invention for practicing the method according to the invention.

FIG. 2 discloses a seven-effect black liquor (cellulose pulp waste liquor) evaporation plant with conventional liquor flow: feed—flash to effect EVI—flash to effect EVII, evaporation in effect EVII-EVI-EV-EIV-EIII-EII-EI-product liquor. Heating vapor flows in the opposite direction, i.e. from effect EI to effect EII and so on. Each of the effects EVII-EII preferably includes one or more of the elements 10. A surface condenser 20 is connected to effect EVII.

The absolute majority of the volatile components in the black liquor is evaporated in flashes and effects EVII, EVI and EV. Thus, the contaminated condensates are produced in effects EVI and EVII and the surface condenser 20. Vapor flows 44, 45 and 46 and uncondensed vapors from evaporation effects in line 51 are condensed in these stages, divided into two condensate flows by the heat exchange elements 10 as described in connection with FIG. 1. Flows 21, 22, 23 have a lower volume but contain the majority of impurities (i.e. volatile compounds such as methanol), and are led to a conventional first steam stripping system (see 66 in FIG. 2). Flows 24, 25, 26 have a higher volume but contain less impurities are led to a second steam stripping system 27 for producing very clean condensate.

Secondary vapor flows in lines 47–50 from the last effects, in relation to the black liquor flow, EIV, EIII, EII and EI are similarly condensed into contaminated condensates 31, 30, 29, 28 and clean condensates 35, 34, 33, 32. Both condensate flows, the first and the second, are flash evaporated through the effects in a conventional manner, where the amount of volatile impurities decreases, but with the difference that they flow as different flows 36 and 37. Conventional flash tanks 67, 68 are preferably also employed to facilitate cleaning of condensates ultimately fed to lines 36, 37 respectively. The very clean condensate 37 (e.g. about 25 ppm methanol or less, preferably about 10 ppm or less) produced from the clean condensates is recovered as the product liquid, whereas flow 36 produced from contaminated condensates by flash evaporation is fed together with cleaner condensates 24, 25, 26 from effects EVI, EVII and surface condenser 20 to the second stripping system 27.

Second steam stripping system 27 comprises a second steam stripping column 38 and a reboiler 39 and it is connected between effects EV and EVI. The stripping steam 40 in the column 38 is obtained from re-boiled condensate 41 from column 38. Driving steam for the reboiler 39 is taken from effect EV. The amount of the steam taken from effect EV to the second stripping column 38 depends on the amount of the condensate to be treated in the column 38 and/or the desired degree of its cleanliness (typically producing condensate having a concentration of methanol—the major volatile compound—of about 25 ppm or less, preferably about 10 ppm or less).

The construction of the heat exchange element of the reboiler 39 is similar to those in the evaporators (i.e. is similar to element 10 in FIG. 1), therefore it also produces a contaminated condensate 42, which is directed to the conventional first steam stripping system 66, and a cleaner condensate 43, which is fed to the second steam stripping column 38.

The vapor side of effect EVI is divided into two compartments 52, 53. Compartment 53 is connected conventionally to the previous effect EV to condense its secondary vapor 44. Compartment 52 operates as a "condenser" for the vapor containing methanol and other impurities in line 59 flowing from the top of second stripping column 38. The construction of "condenser" 52 is also such as to enable the vapor to be condensed there into contaminated condensate 56, which is then directed with other contaminated condensates to be cleaned in line 54. The flow of cleaner condensate is pumped back to the upper part of second stripping column 38 as reflux 55. The uncondensed gases from the condenser compartment 52 are also directed through line 51 to the surface condenser 20, which causes no problems, because the level of COD is very low when compared, e.g., to uncondensed gases from a conventional vapor stripping column (e.g. 66), which treats contaminated condensates in line 54.

The very clean product condensate (about 25 ppm of methanol or less, preferably about 10 ppm or less, e.g. less than 9 ppm) is discharged from the reboiler 39 via line 57, from which it is directed via line 58 together with other very clean condensates 37 to use in other portions of the pulp mill, such as washing or oxygen delignification.

While the second steam stripping column 38 is shown connected between effects EV and EVI, it can alternatively be connected between effect EVI and between EVII, or effect EVII and surface condenser 20 depending, on the desired temperature of the very clean condensate.

The black liquor flow is indicated by lines formed by consecutive dots in FIG. 2. Weak black liquor (or other cellulose pulp waste liquor) in line 60 is fed into effect EV, where the liquor flashes. Then the liquor is passed via line 61 to effect EVI, where it is further flashed. From effect EVI, the liquor is passed via line 62 to effect EVII for evaporation. The liquor is further evaporated in effects EVI, EV, EIV, EIII, EII and EI, as indicated by line 63. The product liquor in line 65 is withdrawn from effect EI, which is driven by fresh steam in line 64.

The above-described embodiment relates to a seven-effect evaporation plant. The invention can, in a similar manner, naturally also be applied to other kinds of evaporation plants having, for example, four, five or six evaporation effects, or even more than seven effects.

EXAMPLE

A seven-effect black liquor evaporation plant having a conventional steam stripping column (66) and an additional steam stripping column (38) according to the invention is provided in which:

Amount of evaporated water: 500 t/h
Amount of clean condensate: (streams 24–26, 32–35) 456.7 t/h
Contaminated condensate (21–23, 28–31) to conventional stripper (66): 43.3 t/h
Amount of methanol in feed waste liquor: 300 kg/h Results:

Amount of methanol in clean condensates:
Conventional method: 60 kg/h (131 ppm), 80% removal efficiency.
According to present invention: 4 kg/h, (8.8 ppm) (very clean condensate), 98.7% removal efficiency.

In the system according to the present invention 43.5% (about 40–50% in a more general case) of the vapor from effect EV is fed to reboiler 39 (via line 69), and the rest directly to effect EVI (via line 44).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of separating volatile compounds from secondary condensates formed in multi-effect evaporation of waste liquor from cellulose pulp processes, utilizing first and second steam stripping columns and a reboiler connected to the second stream stripping column, comprising the steps of:

(a) evaporating, in a multi-effect evaporator, waste liquor from cellulose pulp processing to produce a secondary vapor;

(b) condensing the secondary vapor from step (a) into a first condensate flow having the majority of the volatile compounds condensed, and a separate second condensate flow, the first flow having a lower volume than the second flow;

(c) directing the first condensate flow into the first steam stripping column to produce a first cleaned condensate flow;

(d) directing the second condensate flow into the second steam stripping column to produce a second cleaned condensate flow having a lower concentration of volatile compounds than that of the first cleaned condensate flow;

(e) driving the second steam stripping column utilizing a vapor, distinct from the secondary vapor, from the evaporation of waste liquor of step (a); and directing steam from one of the evaporation effects to vaporize condensate in the reboiler, to produce a reboiler vapor, and directing the reboiler vapor to the second stripping column as cleaning steam therein.

2. A method as recited in claim 1 wherein the multi-effect evaporator has at least four evaporation stages; and wherein step (a) is practiced by evaporating waste liquor in at least a first stage of the multi-effect evaporator to produce the secondary vapor.

3. A method as recited in claim 1 wherein the volatile compounds include methanol as a major component thereof; and wherein steps (a) through (e) are practiced so as to produce a second clean condensate having a methanol concentration of about 10 ppm or less.

4. A method as recited in claim 3 wherein step (a) is practiced by utilizing black liquor from the sulfate pulping of cellulose pulp as the waste liquor.

5. A method as recited in claim 1 wherein step (a) is practiced by utilizing black liquor from the sulfate pulping of cellulose pulp as the waste liquor.

6. A method as recited in claim 1 wherein one of the evaporator stages prior to the plurality of final evaporator stages is divided into two compartments, one of which acts as a condenser and the other of which is connected to a subsequent evaporator stage; and comprising the further step of directing vapor from the top of the second stripping column to the condensing portion of the divided evaporator stage, and directing the resulting condensate to the second stripping column.

7. A method as recited in claim 1 wherein the reboiler has first and second condensate flows, and comprising the further step of directing the first condensate flow from the reboiler to the first steam stripping column, and directing the second condensate flow from the reboiler to the second steam stripping column.

8. A method as recited in claim 1 wherein step (a) is practiced by utilizing black liquor from the sulfate pulping of cellulose pulp as the waste liquor.

9. A method of separating volatile compounds from secondary condensates formed in multi-effect evaporation of waste liquor from cellulose pulp processes, utilizing first and second steam stripping columns, including a plurality of final evaporator stages, comprising the steps of:

(a) evaporating, in a multi-effect evaporator, waste liquor from cellulose pulp processing to produce a secondary vapor by evaporating waste liquor in at least a first stage of the multi-effect evaporator to produce the secondary vapor;

(b) condensing the secondary vapor from step (a) into a first condensate flow having the majority of the volatile compounds condensed, and a separate second condensate flow the first flow having a lower volume than the second flow;

(c) directing the first condensate flow into the first steam stripping column to produce a first cleaned condensate flow;

(d) directing the second condensate flow into the second steam stripping column to produce a second cleaned condensate flow having a lower concentration of volatile compounds than that of the first cleaned condensate flow;

(e) driving the second steam stripping column utilizing a vapor, distinct from the secondary vapor, from the evaporator of waste liquor of step (a);

(f) as of step (a), evaporating the waste liquor in the final evaporator stages to produce a second vapor;

(g) condensing the second secondary vapor into third and fourth condensate flows; and (h) treating the third and fourth condensate flows separately from each other so that at least one of the third and fourth condensate flows comprises clean condensate.

10. A method as recited in claim 9 wherein the volatile compounds include methanol, and wherein step (h) is practiced to produce clean condensate having a methanol concentration of about 25 ppm or less.

11. A method as recited in claim 10 wherein step (h) is practiced by flash evaporation of said third condensate flow to produce a liquid, and then by directing the liquid to the second steam stripping column, to produce a clean condensate having a methanol concentration of about 25 ppm or less.

12. A method as recited in claim 11 wherein step (h) is practiced to produce as the third condensate flow clean condensate having a methanol concentration of about 10 ppm or less.

13. A method as recited in claim 11 further utilizing a reboiler connected to the second steam stripping column; and comprising the further step of directing steam from one of the evaporation effects to vaporize condensate in the reboiler, to produce a reboiler vapor, and directing the reboiler vapor to the second stream stripping column as cleaning steam therein.

14. A method as recited in claim 13 wherein one of the evaporator stages prior to the plurality of final evaporator stages is divided into two compartments, one of which acts as a condenser and the other of which is connected to a subsequent evaporator stage; and comprising the further step of directing vapor from the top of the second stream stripping column to the condensing portion of the divided evaporator stage, and directing the resulting condensate to the second stream stripping column.

15. A method as recited in claim 13 wherein the reboiler has first and second condensate flows, and comprising the further step of directing the first condensate flow from the reboiler to the steam stripping column, and directing the second condensate flow from the reboiler to the second steam stripping column.

16. A method as recited in claim 10 wherein step (h) is practiced to produce clean condensate having a methanol concentration of about 10 ppm or less.

17. A method of separating volatile compounds from secondary condensates formed in multi-effect evaporation of waste liquor from cellulose pulp processes, utilizing first and second steam stripping columns, the multi-effect evaporator having seven evaporation stages and a surface condenser before the first evaporation stage in the direction of waste liquor flow; comprising the steps of:

(a) evaporating, in a multi-effect evaporator, waste liquor from cellulose pulp processing to produce a secondary vapor;

(b) condensing the secondary vapor from step 9a) into a first condensate flow having the majority of the volatile compounds condensed, and a separate second condensate flow, the first flow having a lower volume than the second flow;

(c) directing the first condensate flow into the first steam stripping column to produce a first cleaned condensate flow;

(d) directing the second condensate flow into the second steam stripping column to produce a second cleaned condensate flow having a lower concentration of volatile compounds than that of the first cleaned condensate flow by directing the second condensate flow from the first and second stages, as well as the flow from the surface condenser, to the second steam stripping column;

(e) driving the second steam stripping column utilizing a vapor, distinct from the secondary vapor, from the evaporation of waste liquor of step (a);

(f) evaporation the waste liquor in the third through seventh evaporator stages to produced a second secondary vapor;

(g) condensing the second secondary vapor into third and fourth condensate flows; and (h) directing the fourth condensate flow to the second stripping column while flashing the third condensate flow to produce clean condensate having a methanol concentration of about 25 ppm or less.

18. A method as recited in claim 17 wherein the volatile compounds include methanol as a major component thereof; and wherein steps (a) through (e) are practiced so as to produce a second clean condensate having a methanol concentration of about 10 ppm or less.

19. A method as recited in claim 17 wherein step (a) is practiced by utilizing black liquor from the sulfate pulping of cellulose pulp as the waste liquor.

* * * * *